(12) United States Patent
Docherty et al.

(10) Patent No.: US 12,470,773 B2
(45) Date of Patent: Nov. 11, 2025

(54) METHOD OF MANAGING STORAGE OF USER DATA

(71) Applicant: ThinkAnalytics Ltd., Glasgow (GB)

(72) Inventors: Peter Docherty, Glasgow (GB);
Christopher McGuire, Glasgow (GB);
Ewen Cattanach, Glasgow (GB);
Shahad Ahmed, Glasgow (GB);
Hussain Sabir, El Segundo, CA (US);
Georgios Mamakis, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 104 days.

(21) Appl. No.: 18/130,885

(22) Filed: Apr. 4, 2023

(65) Prior Publication Data

US 2024/0340496 A1 Oct. 10, 2024

(51) Int. Cl.
*H04N 21/466* (2011.01)
*G06F 16/783* (2019.01)
*H04N 21/45* (2011.01)
*H04N 21/482* (2011.01)

(52) U.S. Cl.
CPC ....... *H04N 21/4667* (2013.01); *G06F 16/783* (2019.01); *H04N 21/4532* (2013.01); *H04N 21/4826* (2013.01)

(58) Field of Classification Search
None
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |
| 10,412,454 B2 | 9/2019 | Docherty et al. |
| 11,212,584 B2 | 12/2021 | Docherty et al. |
| 11,343,573 B2 | 5/2022 | Docherty et al. |
| 2002/0059094 A1* | 5/2002 | Hosea ............... H04N 7/17318 348/E7.071 |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — James R Marandi
(74) *Attorney, Agent, or Firm* — Foley & Lardner LLP

(57) ABSTRACT

A method of managing storage of user data of a content recommendation system is provided. The content recommendation system comprises a user learning module for receiving data indicative of user actions, determining one or more learn actions based on the received data and storing the learn actions on a storage resource. The method comprises determining a parameter associated with aging out a learn action stored on a storage resource of a content recommendation system. The learn action determined based on data indicative of a user action. The method further comprises aging out the learn action stored on the storage resource based on the parameter.

20 Claims, 6 Drawing Sheets

(56) References Cited

U.S. PATENT DOCUMENTS

| | | |
|---|---|---|
| 2002/0178257 A1* | 11/2002 | Cerrato ................ G06F 21/316 |
| | | 709/224 |
| 2003/0106064 A1 | 6/2003 | Plourde |
| 2007/0157222 A1 | 7/2007 | Cordray et al. |
| 2008/0304812 A1 | 12/2008 | Jin |
| 2009/0187593 A1* | 7/2009 | Chen ...................... H04L 67/55 |
| | | 707/E17.046 |
| 2010/0005492 A1 | 1/2010 | Takano et al. |
| 2010/0070507 A1 | 3/2010 | Mori |
| 2011/0243529 A1 | 10/2011 | Oryoji et al. |
| 2013/0227600 A1* | 8/2013 | Kamimaeda ...... G06F 16/90324 |
| | | 725/14 |
| 2014/0149344 A1 | 5/2014 | Pudipeddi et al. |
| 2014/0279756 A1 | 9/2014 | Whitman |
| 2015/0082330 A1 | 3/2015 | Yun et al. |
| 2015/0100987 A1 | 4/2015 | Whitman et al. |
| 2015/0269488 A1 | 9/2015 | Galai et al. |
| 2017/0311015 A1 | 10/2017 | Docherty et al. |
| 2020/0252690 A1 | 8/2020 | Docherty et al. |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

* cited by examiner

| Table 1 – CRE learning tables | |
|---|---|
| Section Number | DB Table name |
| Subscriber Timeslot Learning tables | |
| 10.3 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables | |
| 7.3 | re_customer_learned_languages |
| 7.4 | re_content_item_ratings |
| 7.5 | re_feature_ratings |
| 7.6 | re_customer_watched_episodes |
| | |
| Session Learning tables | |
| 12.3 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.3 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.3 | re_sub_learned_language |
| 9.4 | re_sub_content_item_ratings |
| 9.5 | re_sub_feature_ratings |
| 9.6 | re_sub_watched_episodes |

Figure 4

METHOD OF MANAGING STORAGE OF USER DATA

TECHNICAL FIELD

The present disclosure relates generally to a content recommendation system and method, and in particular, to a method and system of managing storage of content user data.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers.

For example, personal video recorders have the capability of recording and storing content items from live linear television broadcasts and downloading and storing content items from video on demand services. As such, the content items stored on such devices provide a content source that is unique to the owner of the personal video recorder.

It has been suggested to provide viewers with content recommendations, which may lead them more rapidly to content that may be of interest. For example, applicant's own U.S. Pat. No. 11,343,573, the relevant portions of which are incorporated herein, describes such a content recommendation system. Such a recommendation system may be based on user data. However, the size of stored user data may be unwieldly when compared with the number of content recommendation requests. Improvements and/or alternatives are accordingly desired. Accordingly, it is an object of this disclosure to address or ameliorate one or more of these issues.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY

In TV systems, or other systems for provision of content to a user, each service provider may have thousand, tens or hundreds of thousands, or millions of customers, wherein each customer is unique and may have different viewing habits and preferences. It has been recognized that each user may require different content recommendations. Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with over one million content recommendation demands per minute during busy periods.

A content recommendation system is able to provide recommendations in real time or near real time for many thousands, tens of thousands, hundreds of thousands, or even tens of millions, or more users. An exemplary content recommendation system is described in applicant's own U.S. Pat. No. 11,343,573, the relevant portions of which are incorporated herein.

Content recommendations may be based on user data, user actions and content data. Content data may include metadata related to the content. User data and actions may be used to build a user history or profile which is used in generating personal content recommendations for the user. Content recommendations may be based on learn action. Learn actions may be records of user activity, e.g., each time a particular user has watched or recorded a programme at any time during the previous six months or other relevant time period. Each learn action may have its own data item, e.g., a table entry, in stored user data. In other words, when a user performs an action, such as watching a programme for a period of time, the user activity may be recorded in the form of a learn action. The learn action may include an indication of the start and stop time the programme was watched, and/or a duration the programme was watched. The learn action may further indicate the programme information. This may include metadata associated with the programme such as actors, genre, rating, length, writer, director, theme, style, etc.

There may several hundreds or thousands of learn action stored for an individual user. In order to maintain sufficient storage to continue to store new learn actions, learn actions may be aged out after a period of time, e.g., 6 months. Aging out learn action may involve deleting or overwriting the oldest learn actions. In this way, sufficient storage is available to store all users learn actions.

However, different users may generate users at different rates. For example a first user may interact with content periodically and thus generate 1 new learn action a week. A second user may watch multiple programmes a day and generate 50 new learn actions a week. After 6 months the first user may have a relatively small dataset of learn actions, while the second user may have a much larger dataset of learn action. Aging out both these users after 6 months may result in an overabundance of learn actions for the second user resulting in delays in generating content recommendations based on the learn actions. Additionally, content recommendations for the first user may not be accurate as learn actions which are older than 6 months that have been aged out may still be highly relevant given the lower frequency of content interaction for the first user.

Accordingly, in an aspect there is provided a method, system and non-transitory computer readable medium which altered the frequency of aging out based on a variable parameter. The parameter may be set based on storage capacity, number content recommendation request (i.e., content recommendation frequency), number of user actions (i.e., frequency of user actions or learn actions), etc. Such a method may improve the content recommendations being generated for a user by ensuring relevant learn actions are maintained even if they are extremely data. Further, such a method may reduce system processing requirements as some learn actions may be aged out even if a pre-set time period has not elapsed. Overall content recommendation performance and efficiency may be improved.

The method may be computer-implemented, i.e., implemented by a computer processor.

In an aspect there is provided a method of managing storage of user data of a content recommendation system, the content recommendation system comprising a user learning module for receiving data indicative of user actions, determining one or more learn actions based on the received data and storing the learn actions on a storage resource, the method comprising:

determining a parameter associated with aging out a learn action stored on a storage resource of a content recommendation system, the learn action determined based on data indicative of a user action.

The parameter represents the adjustability of aging out stored learn action. For example, the parameter may indicate the learn action is to be aged out the storage has reached a certain capacity, if the number of stored learn action has reached a certain number, if a certain number of learn actions have been created, if a number of content recommendations have been requested by the user, or other element or feature of a content recommendation system. By varying when a learn action is aged out, the method may ensure an optimum number of learn actions are available to generate content recommendation, not too many such that generate of a content recommendation, and not too few such the content recommendation is not accurate.

Too many learn actions and the user profile upon which the content recommendation is based may have to take into account too many learn actions. This may result in generating of the user profile taking too long or requiring too much computing resources, e.g., processing power. This may negatively impact other processing aspects of the content generation system. Too few learn action and the user profile may not be accurate. The user profile may not accurately represent a user's preference resulting a substandard content recommendation. This may result in a user not selecting the content, and leaving the provider's interface. This may result in churn, i.e., a user quitting the content operator/provider's system entirely.

Varying the parameter ensures the number of learn actions is optimum. In other words, the number of learn actions is sufficient to have a user profile which accurately represents user preferences and provides content recommendations, but not too high to require significant resources to generate the user profile.

During a content recommendation session, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. Some of these user actions are recorded as learn actions during the session. The content recommendation system, e.g., a user learning module of the system, may include a set of rules for determining which user actions are learn actions.

The learn action may be based on an indication that a user has watched a content item for a specified period of time. The learn action may be used as an indication of user preferences and potentially to provide more accurate recommendations in the future. The learn action may be used to generate a user profile or history. The user profile may be used to provide a content recommendation to the user.

A learn action may only be recorded or generated if an event exceeds a minimum event time filter. In addition, there may be a rule that only one learn action for each content item should be generated. For example, a user may watch a programme and switch channels during an advert break and then return to the original programme. In such an event, only one learn action may be generated.

The parameter may be associated with aging out the learn action and additional data. The additional data may comprise metadata or other information associated with a content item. The metadata may comprise content parameters or properties, such as programme title, time, duration, content type, programme categorisation, actor names, genre, release data, episode number, series number, style, mood, language and theme.

According to another aspect there is provided a method of managing storage of user data of a content recommendation system, the content recommendation system comprising a user learning module for receiving data indicative of user actions, determining one or more learn actions based on the received data and storing the learn actions on a storage resource, the method comprising:

aging out a learn action stored on a storage resource of a content recommendation system based on a determined parameter, the learn action determined based on data indicative of a user action.

The learn action may be based on an indication that a user has watched a content item for a specified period of time. The learn action may be used as an indication of user preferences and potentially to provide more accurate recommendations in the future. The learn action may be used to generate a user profile or history. The user profile may be used to provide a content recommendation to the user.

A learn action may only be recorded or generated if an event exceeds a minimum event time filter. In addition, there may be a rule that only one learn action for each content item should be generated. For example, a user may watch a programme and switch channels during an advert break and then return to the original programme. In such an event, only one learn action may be generated.

The parameter may be associated with aging out the learn action and additional data. The additional data may comprise metadata or other information associated with a content item. The metadata may comprise content parameters or properties, such as programme title, time, duration, content type, programme categorisation, actor names, genre, release data, episode number, series number, style, mood, language and theme.

Aging out may comprise monitoring a frequency of actions by a user and aging out the learn action based on the monitored frequency. The action may comprise content recommendation requests.

Aging out may comprise monitoring a frequency of learn actions generated by a user and aging out the learn action based on the monitored frequency.

If a user requests a significant number of content recommendations, this may be an indication of fraudulent use. For example, a legitimate user may have shared login information with one or more $3^{rd}$ parties. Accordingly multiple actors may be requesting content recommendations under the same user login. This may result in a higher than usual number of content recommendation requests. Further this may result in a higher than usual number of user actions and/or learn actions being generated by user actions. As such the storage of user actions may increase at a higher than usual rate. Monitoring the frequency of user actions, learn actions and/or content recommendation requests aging out at least one learn action based on the frequency may ensure the storage does not contain an excess of learn actions required for a content recommendation request, i.e., for generating a user profile for use in fulfilling a content recommendation request.

According to another aspect there is provided a method of managing storage of user data of a content recommendation system, the content recommendation system comprising a user learning module for receiving data indicative of user actions, determining one or more learn actions based on the received data and storing the learn actions on a storage resource, the method comprising:

determining a parameter associated with aging out a learn action stored on a storage resource of a content recommendation system, the learn action determined based on data indicative of a user action; and aging out the learn action stored on the storage resource based on the parameter.

The learn action may be based on an indication that a user has watched a content item for a specified period of time. The learn action may be used as an indication of user preferences and potentially to provide more accurate recommendations in the future. The learn action may be used to generate a user profile or history. The user profile may be used to provide a content recommendation to the user.

A learn action may only be recorded or generated if an event exceeds a minimum event time filter. In addition, there may be a rule that only one learn action for each content item should be generated. For example, a user may watch a programme and switch channels during an advert break and then return to the original programme. In such an event, only one learn action may be generated.

The parameter may be associated with aging out the learn action and additional data. The additional data may comprise metadata or other information associated with a content item. The metadata may comprise content parameters or properties, such as programme title, time, duration, content type, programme categorisation, actor names, genre, release data, episode number, series number, style, mood, language and theme.

Aging out may comprise monitoring a frequency of actions by a user and aging out the learn action based on the monitored frequency. The action may comprise content recommendation requests.

Aging out may comprise monitoring a frequency of learn actions generated by a user and aging out the learn action based on the monitored frequency.

If a user requests a significant number of content recommendations, this may be an indication of fraudulent use. For example, a legitimate user may have shared login information with one or more $3^{rd}$ parties. Accordingly multiple actors may be requesting content recommendations under the same user login. This may result in a higher than usual number of content recommendation requests. Further this may result in a higher than usual number of user actions and/or learn actions being generated by user actions. As such the storage of user actions may increase at a higher than usual rate. Monitoring the frequency of user actions, learn actions and/or content recommendation requests aging out at least one learn action based on the frequency may ensure the storage does not contain an excess of learn actions required for a content recommendation request, i.e., for generating a user profile for use in fulfilling a content recommendation request.

Determining the parameter may comprise monitoring a frequency of user actions, learn actions and/or content recommendation requests. Determining the parameter may further comprise setting the parameter based on the monitored frequency.

If a user requests a significant number of content recommendations, this may be an indication of fraudulent use. For example, a legitimate user may have shared login information with one or more $3^{rd}$ parties. Accordingly multiple actors may be requesting content recommendations under the same user login. This may result in a higher than usual number of content recommendation requests. Further this may result in a higher than usual number of user actions and/or learn actions being generated by user actions. As such the storage of user actions may increase at a higher than usual rate. Monitoring the frequency of user actions, learn actions and/or content recommendation requests aging out at least one learn action based on the frequency may ensure the storage does not contain an excess of learn actions required for a content recommendation request, i.e., for generating a user profile for use in fulfilling a content recommendation request.

Determining the parameter may comprise monitoring a remaining storage capacity of the storage resource and setting the parameter based on the remaining storage capacity. Setting the parameter based on the remaining storage capacity may ensure a fixed amount of storage is used for storing the learn actions. Once the fixed storage is reached, learn actions may be aged out ensuring a set storage capacity is not exceeded.

The storage resource may comprise random access memory (RAM), a hard disk storage resource and a memory cache. The learn actions may be stored at substantially contiguous physical storage locations or sectors of a storage resource. A specific user's learn actions may be stored in a portion or partition of the storage resource.

Determining the parameter may comprise monitoring a number of learn action stored on the storage resource. The parameter may be set based on the number of learn action stored on the storage resource.

The parameter may comprise a number of learn actions stored on the storage resource. For example, the parameter may be 50, 100 or another other positive integer. Once the number of learn actions stored on the storage resource reaches the parameter, the first stored, i.e., the oldest learn action, may be aged out.

Aging out may comprise aging out the learn action based on the number of actions stored on the storage resource exceeding a threshold. The threshold may represent a capacity of the storage resource, or a portion or sector of the storage resource.

Aging out may comprise deleting the learn action. Deleting the learn action may allow a new learn action to be generated and/or stored on the storage resource.

Aging out may comprise modifying a decay function for assigning weights to a plurality of learn actions stored on the storage resource. A user profile or history may be generated based on one or more stored learn actions. The user profile may be generated using a decay function which assigns a weight to learn action in order to sum the learn action into a user profile. The decay function may comprise a plurality of coefficients, each coefficient corresponding to one of the learn action. The decay function may assign a lower weight to learn actions which is historically older compared to learn actions which are newer or more recent. The decay function may thus tail off such that older learn actions do not significantly impact a user profile generated using the decay function.

Aging out a learn action may comprise modifying the decay function. Modifying the decay function may comprise altering a coefficient of the function associated with the learn action. Modifying the coefficient may comprise setting the coefficient to null or zero. Thus, the aged out learn action may not impact generation of the user profile from the decay function.

The decay function may not be regenerated every time a new learn action is generated or stored. In other words, the output of the decay function may be maintained despite a new learn action being generated or stored. Further, the learn actions may be maintained and aging out may comprise modifying one or weights of the decay function. The decay function may then be regenerated based on the same stored learn actions, but with modifying weights. The result may be a different user profile or history upon which a content recommendation may be generated.

The decay function, once calculated based on the learned actions, may not be overwritten upon receiving a new recommendation request, but used for some amount of time for all new recommendation requests. The decay function may be regenerated after some period of time.

The learn actions may be stored in a first storage resource, e.g., a hard disk storage resource. The learn actions may then be transferred or loaded into a second storage resource, e.g., a cache or RAM. The learn actions may be transferred to improve overall system performance and speed. The second storage resource may be more easily accessed or accessed more quickly than the first storage resource. The decay function may apply weight to the learn functions loaded in the second storage resource.

Accordingly, aging out may comprise deleting the learn actions stored in the first and/or second storage resource. Alternatively, or additionally, aging out may comprise modifying the decay function such as by modifying weighs to be applied to the learn action loaded in the second storage resource.

Modifying the decay function may allow for improved scalability of the method to larger datasets, i.e., larger sets of learn actions. Modifying the decay function without changing, i.e., overwriting or deleting, the learn action allows for the decay function to instantly disregard the learn action, or for the learn action to have a reduced effect on the decay function. This may allow for the user profile or history to be updated faster than if the learn action has to be first deleted, then the decay function generated.

The learn action may comprise a first learn action. Aging out may comprise overwriting the first learn action with a second learn action.

The method may be adapted to manage storage of user data associated with a plurality of users. In particular, learn actions of a plurality of users may be stored on the storage resource. Learn actions of each user may be stored in a different sector or portion of the storage resource.

Determining the parameter may comprise determining a first user-specific parameter for user actions performed by a first user of the plurality of users. In other words, the parameter may be user-specific in that each user may have it owns associated parameter which controls aging out of learn actions generated from actions of that user.

Aging out may comprise aging out a first learn action associated with the first user based on the first user-specific parameter.

Determining the parameter may comprise determining a second user-specific parameter for user actions performed by a second user of the plurality of users.

Aging out may comprise aging out a second learn action associated with the second user based on the second user-specific parameter.

The parameter may be content type specific, content source specific, or user type specific. Types of content may have unique parameters, i.e., content type parameter. For example, sporting events, movies and episodic content (e.g., television shows) may each have their own unique parameter. The sporting event parameter, for example, may be associated with aging out learn actions generated from user actions on content relating to sporting events. In this way certain types of content may be aging out before other content. For example, it may be advantageous to age out sporting content sooner than movie content as movie content may be a better indicator of a user's content preferences.

Content sources may have unique parameters, i.e., content source parameter. For example, content from video-on-demand (VOD), content from a personal video recorder (PVR), live television and pay television may each have their own unique parameter. The PVR parameter, for example, may be associated with aging out learn actions generated from user actions on content originating from a PVR. It may be advantageous to age out content from certain sources sooner than other. For example, learn actions from pay television may be stored and not aging out for an extended period of time compared to learn actions generated from VOD content. Given a user has paid for certain content, it may that learn actions associated with this content is a more relevant indicator or user preferences and should continue to be used to build a user profile for generating content recommendation requests.

User types may have unique parameters, i.e., user type parameter. For example, different user types or categories of users may each have their own parameter. A subscriber, for example, may have a plurality of users associated with it may represent a single user type. A subscription may be associated with a household and there may be a plurality of users, for example family members, associated with the subscription and who may, for example, store content in the storage resource. As a further example, a user may be a customer. As a further example, a user may simply be a viewer of a user device, e.g., television, mobile device, to view content. The user type may thus be unregistered or anonymous. Anonymous users may be associated with anonymous profiles which may be generated in two different modes of operation: session mode (either single-session or multi-session mode) and cookie mode. The parameter may thus be specific to session mode or cookie mode users, or simply to anonymous users. It may be beneficial to age out learn actions of anonymous users sooner than subscriber, as a user profile of an anonymous may be less relevant than a subscriber given it may unknown of the anonymous user is changing and therefore changing user content preferences.

The content recommendation system may comprise a content recommendation engine for providing a content item recommendations based on an actions of the user and content information concerning content available from one or more content sources.

According to another aspect there is provided a non-transitory computer-readable medium having computer program code stored thereon, the program code executable by a processor to perform a method according to any of the described aspects.

According to another aspect there is provided a computer program product comprising computer-readable instructions that are executable to perform a method according to any of the described aspects.

According to another aspect there is provided content recommendation system comprising a user learning module for receiving data indicative of user actions, determining one or more learn actions based on the received data and storing the learn actions on a storage resource, the user learning module for managing storage of user data of the content recommendation system, the learning module configured to:
  determine a parameter associated with aging out a learn action stored on a storage resource of a content recommendation system, the learn action determined based on data indicative of a user action.

The learning module may be further configured to:
age out the learn action stored on the storage resource based on the parameter.

While the learning module is described as being adapted to determine the parameter and age out, other parts of the content recommendation system may be adapted to perform these actions. For example a content recommendation engine (RE) may be adapted to determine the parameter and/or age out a learn action.

The learning module may be further configured to:
monitor a frequency of user actions and set the parameter based on the monitored frequency.

The learning module may be further configured to:
monitor a frequency of content recommendation requests and set the parameter based on the monitored frequency.

The parameter may comprise a content type parameter, a content source parameter, or a user type parameter.

The learning module may be further configured to:
determine the content type parameter associated with aging out a learn action stored on the storage resource, the learn action determined based on data indicative of a user action with content of a specific content type.
determine the content source parameter associated with aging out a learn action stored on the storage resource, the learn action determined based on data indicative of a user action with content from a specific content source, or
determine the user type parameter associated with aging out a learn action stored on the storage resource, the learn action determined based on data indicative of a user action by a specific user type.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 4 is a representation of information stored on a hard disk storage resource.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognized pursuant to the present invention that each may require different content recommendations. Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with hundreds of thousands of content recommendation demands per minute during busy periods.

Figure 1:
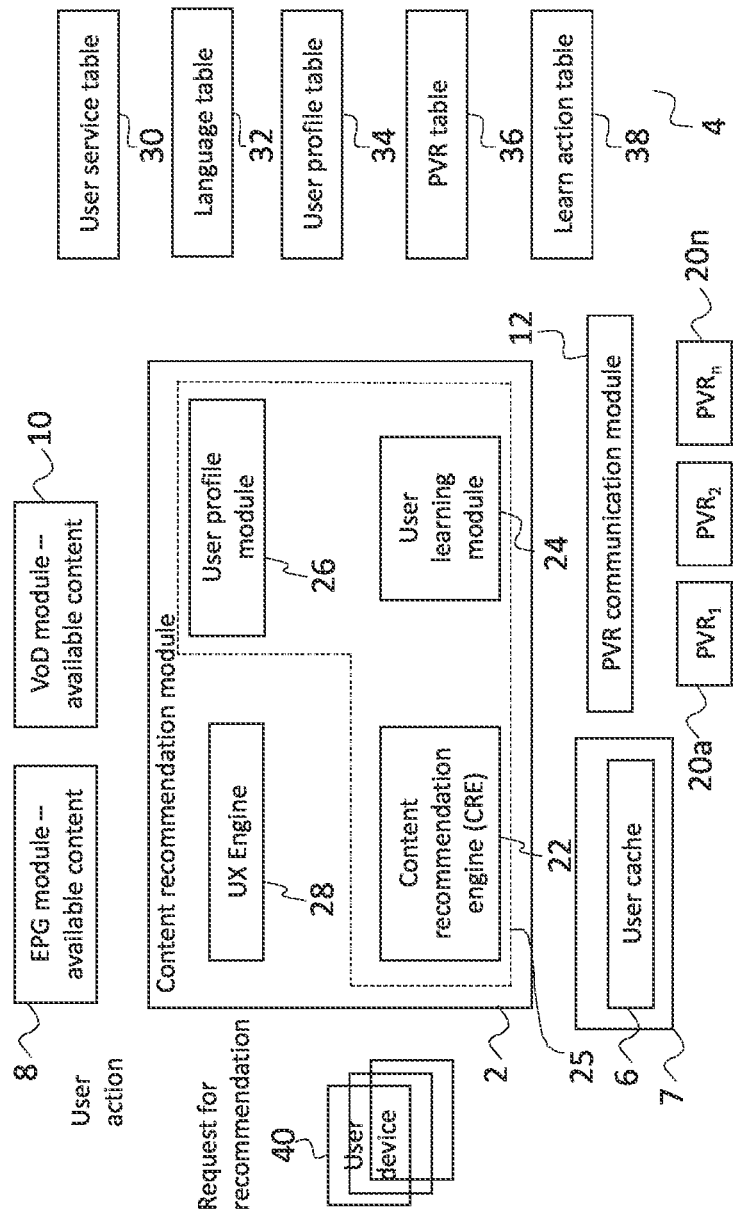
FIG. 1 is a schematic diagram of a digital content recommendation system.

FIG. 1 shows a schematic diagram of a digital content recommendation system according to an embodiment. The system is able to provide content recommendations in real time or near real time for many thousands, tens of thousands or even hundreds of thousands or more users. Example modes of operation are described below in relation to PVRs associated with users, but content recommendations may be provided to or in respect of any suitable users or user accounts, with recommended content being provided or accessible via any suitable devices, for example set-top boxes, smartphones, PCs or tablets or any other suitable content delivery mechanism.

The system comprises a content recommendation module 2 linked to a first storage resource in the form of a hard disk storage device 4, which is used to store various user data. The content recommendation module 2 is also communicatively linked to a second storage resource in the form of a local storage device that includes at least one cache, for example a user cache 6. In the embodiment of FIG. 1 the local storage device is in the form of RAM, but any suitable storage device may be used in alternative embodiments. The user cache 6 may be used for temporary storage of user data obtained from the hard disk storage device 4 during a content recommendation session, as discussed in more detail below. While the system has been illustrated and described as comprise first and second storage resources, one of skill in the art will appreciate more or less storage resources may be present. For example, the system may comprise a single storage resource. The storage resource may comprise a hard disk storage device.

The content recommendation module is able to communicate, either directly or indirectly, and either via wired or wireless connection, with very large numbers of users or user devices 40 and to provide recommendations for or derived from such users or user devices. Other than some PVRs which are shown schematically in FIG. 1, only a few user devices 40 are shown in FIG. 1 for clarity. The user devices 40 may include, as examples only, a user's mobile phone, smart TV, tablet computer, laptop, smart watch or other suitable viewing device. Although the user devices 40 could belonging to a user, they could also comprise any other device that the user is logged into.

The content recommendation module 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, Content Recommendation Module 2, the User Cache 6, the PVR Communication module 12 and the EPG module 8 are implemented in a server. The server includes communication circuitry that enables communication between the server, or appropriate components of the server with each of the user devices, and with the content sources, for example a TV service operator or other content service operator.

Any other suitable implementation of the EPG module 8, the VoD module 10, content recommendation module 2, the user cache 6, the PVR communication module 12 and the EPG module 8 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices, for example to receive user action data, to determine when a content recommendation is required for a particular user, and to supply content recommendations to the user devices. In alternative embodiments, the content recommendation module 2 communicates with the user devices via the content sources or via other servers or devices. For example, in such alternative embodiments, the user action data may be sent to the content recommendation server via one of the content source servers or other server or device, and the content recommendations may be sent to the user devices from the content recommendation module 2 via the content source servers or other server or device.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the content recommendation module 2. As can be seen in FIG. 1, the content recommendation module 2 is configured to communicate with the one or more content information modules: the electronic programme guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. A personal video recorder (PVR) communication module 12 provides a communication interface between the one or more PVRs 20a, 20b, . . . 20n and the content recommendation module 2.

The content recommendation module 2 has a content recommendation engine (CRE) 22 and a user learning module 24. The CRE 22 applies a set of processes to determine, in real time, content recommendations for a user based on user data and available content. The user learning module 24 receives data indicative of selections or other actions by a user and builds up a set of user data, for example comprising or representing a user history or profile, which is stored in the hard disk storage 4, and which is used in generating personalized recommendations for the user. Operation of the CRE 22 and the user learning module 24 is discussed in more detail below.

Figure 2:
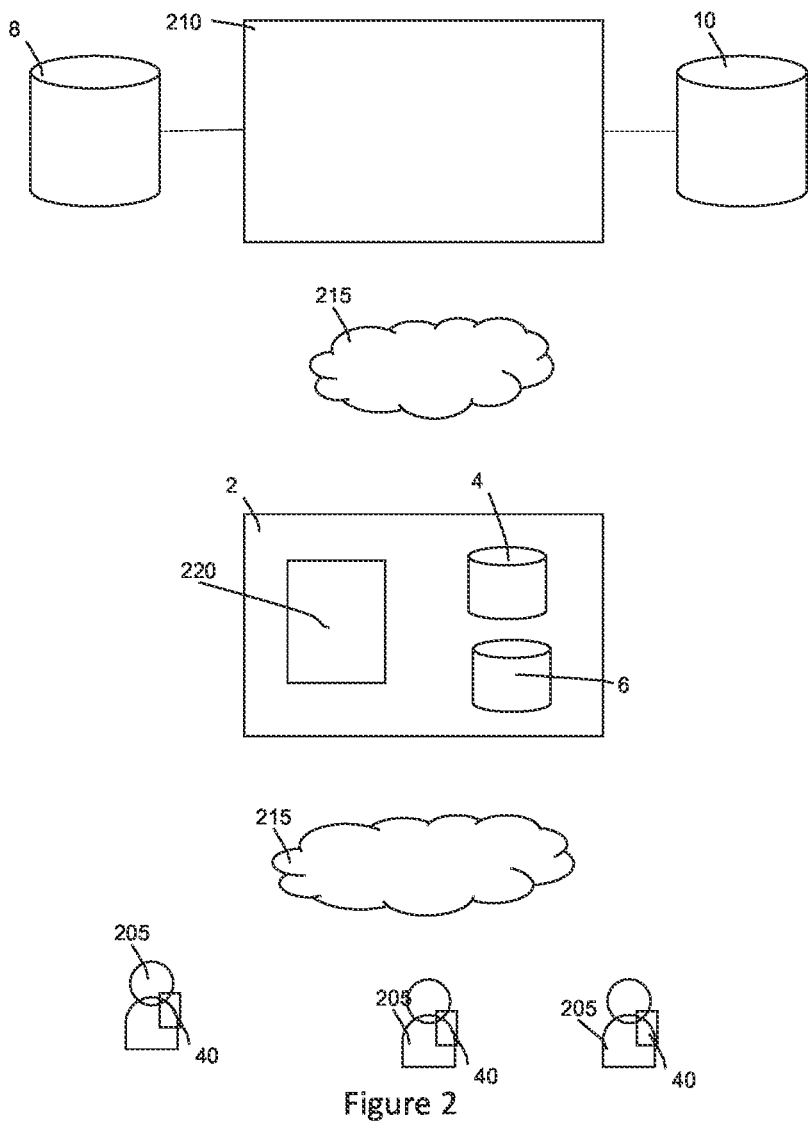
FIG. 2 is a simplified schematic of the system of FIG. 1.
Figure 3:
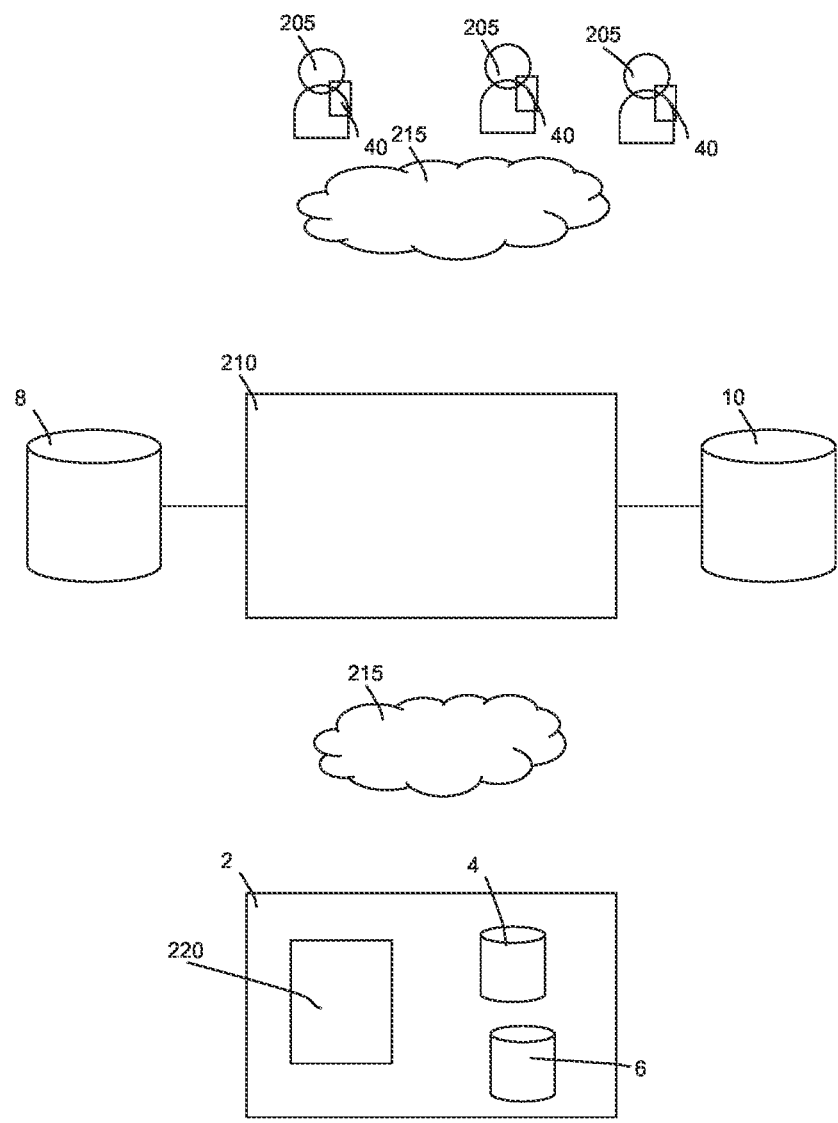
FIG. 3 is a simplified schematic of an alternative system arrangement to that of FIG. 2.

In this embodiment, the content recommendation module 2 further includes a user experience (UX) engine 28 for configuring user content selection interfaces that allow users 205 (see FIGS. 2 and 3) to navigate and select content from a content service provider (210, also shown in FIGS. 2 and 3). In particular, the UX engine 28 can be used to provide customised user content selection interfaces that are customised or otherwise specifically configured to a specific user 205 or group of users 205. The customization comprises customizing the order in which groups of content is presented to a user 205 or groups of users 205 so that groups of content more likely to be of interest to the user 205 are presented earlier, or in preference to groups of content that are less likely to be of interest to that user 205.

The content recommendation module 2 further includes a user profile module 26. The CRE 22, user learning module 24 and user profile module 26 may be included in a recommendation service 25.

As discussed in more detail below, the user profile module 26 is operable to use first party data obtained by an operator of the system to determine user activity profiles of individual users 205 or sets of users 205, which are representative of actions of a user 205 with respect to content selection interfaces.

FIG. 1 shows a request for recommendation for the user being received by the content recommendation module 2. FIG. 1 also shows a user action being received by the content recommendation module 2. In addition to receiving requests for recommendation, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. As will be described in more detail, certain user actions are turned into learn actions by the user learning module 24. The learn action may be processed by the user profile module 26, the UX engine 28 and the content recommendation engine 22 as well. The user profile module 26 may store user data on the hard disk storage 4 to generate and update one or more user profiles for users 205.

The system of FIG. 1 is configured to operate with a plurality of user devices (not shown) each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user device is communicatively coupled to the content recommendation module 22. The CRE 22 of the content recommendation module 2 has an application programming interface (the recommendation engine API) that provides a set of rules for search and recommendation requests to be communicated between the user device and the CRE 22. The user device is configured to send a recommendation request, directly or indirectly, to the CRE 22.

The user cache 6 is coupled to the content recommendation engine 22 and is configured to store data for the content recommendation engine 22. The content recommendation module 2 can access data stored on the user cache 6. The user cache 6 may be provided in random access memory (RAM) 7.

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendation module 2 via requests made through the data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 30 that represent user service requirements, at least one language table 32, at least one user profile table 34 that includes user attribute data that may be considered to represent a user profile, a PVR table 36 and a learn action table 38.

The learned language table 32 stores data relating to audio languages of content items that have been user actioned by the user. For example, the feedback table can store learned language information, the date at which the language was learned and an indication of whether or not the entry has been aged out.

A user profile, which is stored in the user profile table 34, may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

The PVR table 32 stores metadata or other information concerning items of content stored on at least one PVR, e.g., PVR 20a, 20b, . . . 20n, substantially without duplication (for example, substantially the same amount of data is stored regardless of whether an item of content is stored on one, thousands or millions of PVRs) the amount of storage required, and data access times can be reduced. This can be particularly significant in systems such as that of FIG. 1 which may be required to provide real-time personalized content recommendations to thousands, tens or hundreds of thousands, or millions of users subject to strict time constraints.

Additionally, in the embodiment of FIG. 1, the tables stored on hard disk storage device 4 may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in a learn action table 38. The learn action (i.e., stored data item) may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier).

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system.

In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Returning now to FIG. 1, in the learning tables described, e.g., the learn action table 38, a distinction is made between different types of user and different sets of the tables are stored for the different types of users. FIG. 4 is a representation of certain database learning tables stored on the hard disk storage resource 4 of the embodiment of FIG. 1.

As the content recommendations engine 22 supports different categories of user, the tables of FIG. 4 correspond to different categories or types of user. The categories or types in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of users associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed by the content recommendations engine 22.

For each user of all categories, the content recommendations engine 22 has separate groups of learning tables. In FIG. 4, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier; time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value to be used by the recommendation engine 22; feature ratings; content source ID; client type ID; series title of content tem and content item instance identifier. A flag is also stored to indicate if the recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

Additionally, the learn tables illustrated in FIG. 4 may include the learn action table 38 of FIG. 1. As will be described, the user learning module 24 determines whether user data should be stored in the learn action table 38 in respect of a particular user action or set of actions. For example, if a user only views a programme for a very short period of time, for instance if they are channel surfing, then user data is not stored in any of the user learning tables, e.g., the learn action table 38, in respect of that action. User data can be stored in respect of a variety of different user actions or events, for example selecting, viewing, recording or searching for content.

As will be described, a parameter associated with aging out data items (i.e., learn actions), in the learn action table 38 may be specific to the described user types of categories.

One mode of operation of the system of FIG. 1 will now be described. The system of FIG. 1 includes three sources of content for a user device: real-time linear television, for example terrestrial or satellite broadcast television; one or more VoD services, and pre-recorded videos stored on one or more PVRs. More or fewer sources of content may be present.

As a first stage, a user initializes a viewing session through a first initiation event. An initiation event can, for example, be a user logging on to a service provider or turning on the user device. The initiation event is communicated to the content recommendation module 2 via a communication channel between the user device, for example a set top box or other device, for example at the user's home or other remote location, and the content recommendation module 2. In the embodiment of FIG. 1 there is direct communication between the user device and the content recommendation module 2. In alternative embodiments, communication between the user device and the content recommendation module 2 is mediated or passes through, for example a content provider, for instance a TV system operator to which the user subscribes.

In response to the initiation event, the user is then presented, via a display of the user device, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In some embodiments, the initiation event may be treated automatically by the content recommendations module as being a request for recommendations for the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM.

The user data are maintained in RAM 7 throughout the content recommendation session.

The CRE 22 also maintains content data in the RAM, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information to generate a personalized or other content item recommendation for the user. Any suitable content recommendation process may be used, for example based on a weighting, scoring and/or matching process generated based on previous user actions, and matching to available content. The content recommendation process may be at any desired level of simplicity, complexity or sophistication. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation process can be more sophisticated and, may be for example based on similarities or cross-correlations between different content parameters and user actions and properties based on large amounts of historical data. Any suitable content recommendation process may be used.

Once the CRE 22 has performed the content recommendation process, the content recommendation(s) generated by the CRE 22 are then transmitted to the user device either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation(s) may be transmitted in any suitable fashion either to the user device, or to the database, server or other device. In the described embodiment, software installed at the user device determines whether or how the content item recommendation are displayed on the user interface.

Subsequently, during the content recommendation session, a second or subsequent recommendation request may be generated in response to subsequent user activity. For example, this may occur when a user accesses the user interface, changes a channel or the user pauses playback of a previously selected content item. In general, the request for recommendation will generally coincide or anticipate a viewer accessing the user interface such that a recommendation can be posted to the user interface and presented to the user together with choice of other content items.

The request may be transmitted directly from the user device to the recommendation module. Alternatively, the request may be transmitted indirectly. For example, the user device may send a request to a separate server to be relayed to the content recommendation module 2. As another alternative, a server hosting the content that is being recommended may request the content recommendation for the user, and then the server may provide the recommendation to the user together with the choice of content items.

The request may be in the form of an indication that the user or user device has taken or requested a particular action, and the content recommendation module 2 may interpret this as a request to provide a content recommendation.

In response to the subsequent recommendation request the CRE 22 performs a further content recommendation process as outlined above to generate a personalized or other content item recommendation for the user. Again, once the CRE 22 has performed the content recommendation process, the content recommendation(s) generated by the CRE 22 are then transmitted to the user device. The user device determines whether or how the content item recommendations are displayed on the user interface. For example the content item recommendations may be displayed on a new EPG screen corresponding to a selection made by the user, with the recommendation request having been generated by the selection made by the user.

As with the content recommendation made in response to the initiation of the user session, there may be significant constraints on how quickly the subsequent content recommendation should be provided. For example, there may be requirement that the content recommendation is provided within 200 ms or 300 ms, or within any other time period that would enable the content recommendation to be displayed simultaneously with, overlaid on or forming part of the new EPG screen when the new EPG screen is first displayed. In some embodiments the user device may be configured not to display the content recommendation if it is not received within a threshold time, for example within 30 s, 10 s, 5 s or 1 s by way of example, and for example to proceed with display of the EPG screen without the content recommendation. Any other suitable display output may be used as well as or instead of an EPG screen in alternative embodiments, for example a window or a selected portion of a screen or window.

It can be understood that the time constraints on providing content recommendations can be significant, given that personalized content recommendations may need to be generated on the fly, particularly as it may be necessary to provide personalized content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM 7 user data for said plurality of the users substantially simultaneously. For example, user data may be maintained in the RAM 7 for thousands, hundreds of thousands or even millions of users substantially simultaneously, depending on the RAM 7 storage capacity available and the number of subscribers or other users associated with the system.

In the described embodiment, a part, generally a large part, of the user data comprises user history or user action data, e.g., a learn action stored the learn action table 38, that represent user actions over a significant period of time. The CRE 22 can use such user data in real time during a content recommendation process to determine content recommendations.

In various embodiments, there is a limit to how long user data, e.g., learn actions in the learn action table 38, is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

Further, it is a feature of the embodiment of FIG. 1 and at least some other embodiments that during a content recommendation session for a particular user, the user data for that user may change or be added to. Thus content recommendations may need to be based on user data which is itself changing during the content recommendation session, which provides further technical considerations and challenges. For example during a content recommendation session, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the content recommendation module 2 during the session. Some of these user actions are recorded as learn actions to be stored in the learn action table 38 during the session. The user learning module 24 includes a set of rules for determining which user actions are learn actions.

A learn action may be based on an indication that a user has watched a content item for a specified period of time. The information may be used as an indication of user preferences and potentially to provide more accurate recommendations in the future. As discussed, a minimum event time filter may be implemented to ensure that short period events are not sent to the recommendation engine 22. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action for the content recommendation engine 22 may be generated according to some embodiments.

Figure 5:
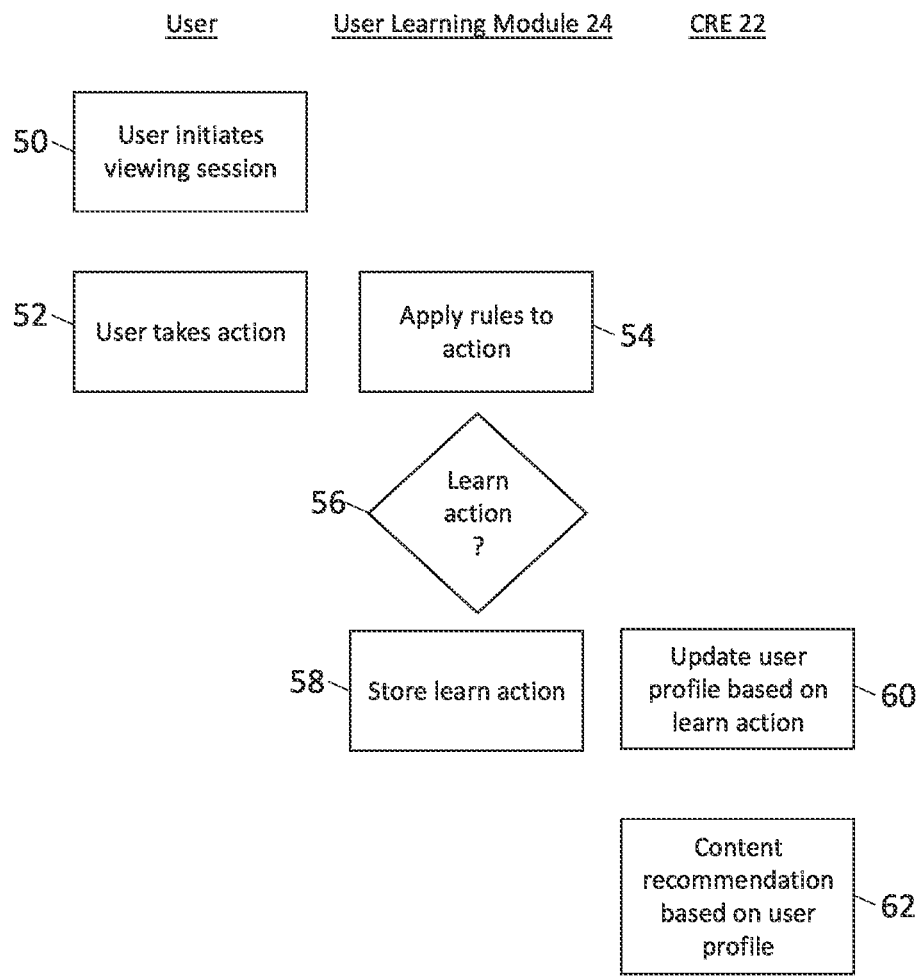
FIG. 5 is a flow chart of a method of generating learn actions.

The user learning module 24 may generate learn action based on the user actions as illustrated in FIG. 5. As illustrated in FIG. 5, a user initiates a viewing session in step 50. The user may then take an action, i.e., a user action, in step 52. The user action may take a variety of forms. For example, the user action may be a request to record content on live television at a later date and/or time. The user action may be the purchase of a paid event such as a live sporting event or concert. The user action may be a positive or negative rating to a piece of content indicating a user like or dislike of the content. The user action may also comprise viewing content, e.g., a movie or television show, for a period of time.

The user learning module 24 applies a set of rules to the user action in step 54 to determine if the user action is a learn action in step 56. The classification or generation of a learn action may be based on an indication that a user has watched a content item for a specified period of time. A learn action may be generated if the duration of watching the content exceeds a minimum time filter. In addition, there may be a rule that only one learn action for each content item should be generated. For example, a viewer may watch a programme and switch channels during an advert break and then return to the original programme. In such an event, only one learn action for the may be generated. The learn action may then be stored in step 58, for example on the hard disk storage 4 in the learn action table 38.

The CRE 22 may update a user history or profile based on the stored learn action in step 60. This may be done every time a learn action is stored, or may only be done after a predetermined time has elapsed, or a predetermined number of learn actions have been generated. When a user initiates a content recommendation request, the CRE 22 may access the user profile to provide recommended content. In this way, new learn actions may change the user profile thereby changing recommended to the user.

The illustrated steps may be performed by different actors. For example, the CRE 22 may store the learn action in step 58. Further, the user learning module 24 may update the user profile based on the stored learn action in step 60.

New user data, for example new table entries in the table 38, corresponding to the learn actions for the user ultimately are stored in the hard disk storage 4. However, it is a feature of the embodiment of FIG. 1 and of at least some other embodiments that user data for the user stored in RAM 7 during a content recommendation session for that user is updated, based on the learn actions for the user occurring during the content recommendation session, on an ongoing basis. Thus, the user data for a user stored in RAM 7 may change during a content recommendation session for the user, such that the content recommendations are based on the most up-to-date user data.

However, regardless of where learn actions are stored, i.e., on the RAM, cache 6, or hard disk storage 4, learn actions may be aged out after a period of time. Aging out may comprise overwriting learn action, deleting learn action or altering a coefficient of a decay function associated with the learn action to null or zero, effectively removing the learn action from a calculation of the user profile or history. Learn action may be aged out based on a pre-determined period of time elapsing. For example, 6 months after a learn action is generated and stored, the learn action may be aged out. Older learn actions may be irrelevant to current user content recommendation. Thus, aging out the oldest learn actions may not negatively impact content recommendation requests. Further, aging out learn action ensures finite storage space is not filled with older, less relevant learn action.

However, aging out based on a predetermined time period does not account for difference in learn action generation between different users. A first user may only view content once a day and therefore only generate one new learn action a day. After 6 month the user may only have 180 learn action stored. In contrast, a second user may have contents view a day, and therefore 1800 learn actions stored. The second user may learn action table 38 may take up too much space compared to the first. Further, the decay function of the second profile may be too computationally intensive to calculate given the large number of learn action. Additionally, the user profile of the first user may be inaccurate given it is only based on 180 learn actions.

Figure 6:
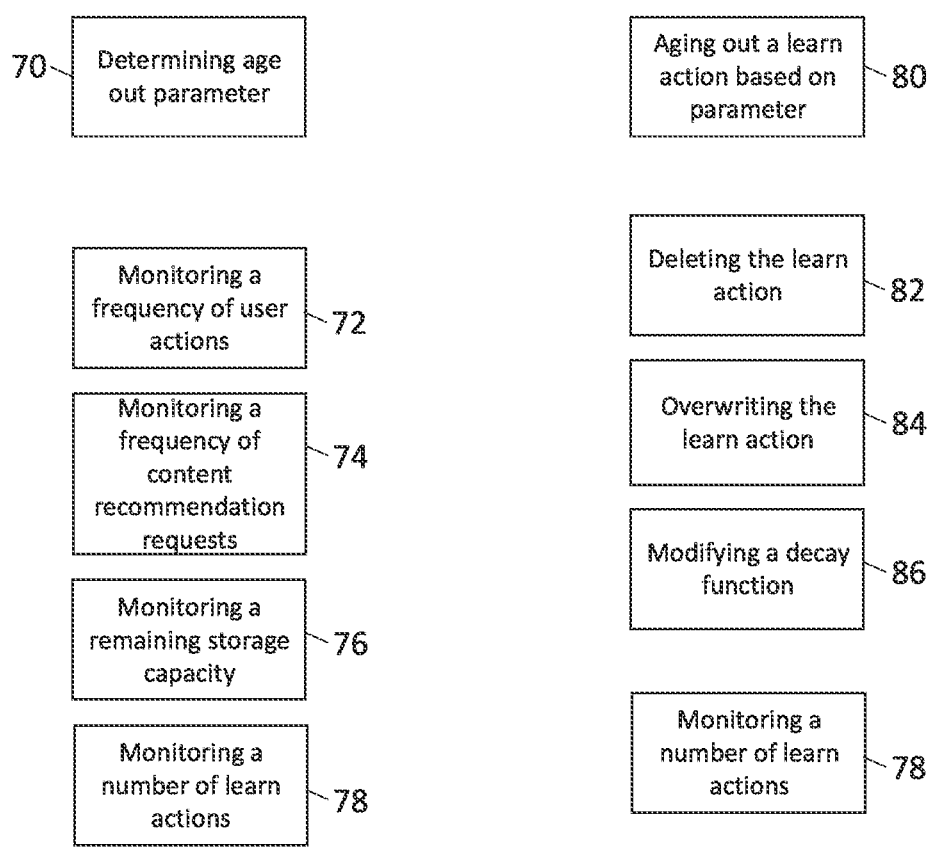
FIG. 6 is a flow chart of a method of aging out learn actions.

Accordingly, rather than age out learn actions based on a predetermined time frames, learn actions may be aged out based on a determined parameter. Turning to FIG. 6, a flowchart of a method of managing user data is illustrated. The method includes determining (step 70) a parameter associated with aging out a stored learn action, e.g., a learn action stored in learn action table 38 in the hard disk storage resource 4. The parameter may be determined in variety of ways. Examples of the determining step 70 are illustrated in FIG. 6 as steps 72-78.

A frequency of user actions may be monitored in step 72. The parameter may be set based on the monitored frequency. For example, if the frequency is very low, it indicates the user is not using the system often. As such, the parameter may be set to age out learn action after 9 months rather than a default time frame of 6 months.

A frequency of content recommendation requests may be monitored in step 74. The parameter may set based on the monitored frequency. For example, if a user is requesting content extremely often, the default aging out parameter may be reduced from 6 months to 3 months based on a greater number of learn actions likely being generated.

A remaining storage capacity of the storage resource may be monitored in step 76 to determine the parameter. The parameter may set based on the monitored storage capacity. The storage capacity may be the entire storage capacity, but rather a storage capacity allocated to the particular user associated with the parameter, i.e. a portion or sector of the storage resource. When a storage capacity of the storage resource reaches a threshold, the parameter may indicate that aging out of the historically oldest learn action should be undertaken. This way learn actions may never take too much storage capacity on the resource, e.g., hard disk resource 4.

A number of learn actions stored on the storage resource may be monitored in step 78 to determine the parameter. The parameter may set based on the monitored number of stored learn actions. When the stored learn actions reaches a threshold the parameter may indicated stored learn actions should be aged out.

The method further comprises aging out a learn action based on the parameter in step 80.

A learn action may be aged out in variety of ways. Examples of the aging out step 80 are illustrated in FIG. 6 as steps 82-88. For example, the learn action may be deleted in step 82. Alternatively, the learn action may be overwritten by a newly generated learn action in step 84. As a further alternative, a decay function associated with generation of a user profile of history for generating a content recommendation request may be modifying in step 86. The decay function may assign weights to learn actions. More recent learn actions may have higher weights and therefore greater impacts on content recommendations than older learn actions which have lower weights. In this way, historically old learn actions may have reduced impact in determining content recommendations (and generating a user profile). Aging out may comprise modifying a coefficient of one element of the decay function to null or zero such that the associated learn action does not impact the content recommendation.

While the parameter has been generally described as being associated with aging out learn actions, the parameter may be content type specific, content source specific or user type specific. In other words, the parameter may be associated with aging out certain types of content (e.g., movies, episodes, sporting events, etc.). The parameter may be associated with aging out content from a certain source (e.g., pay television, free to air television, VoD, PVR content, etc.). The parameter may be associated with certain user type or categories (e.g., an anonymous user, a subscriber, a customer, etc.).

Aging out the learn action may include aging out the learn action and additional data, e.g., metadata associated with the content. For example, the learn action may represent the start and stop time viewing of the content. The metadata may indicate the genre, actors, theme, style, writer, director, etc., of the content. The method may include aging out the learn action as well as this metadata.

The method illustrated in FIG. 4 may performed by the user learning module 24, the CRE 22, or another element of the system.

Each individual feature described herein is disclosed in isolation and any combination of two or more features is disclosed to the extent that such features or combinations are capable of being carried out based on the present specification as a whole in the light of the common general knowledge of one of skill in the art, irrespective of whether such features or combination of features solve any problems disclosed herein, and without limitation to the scope of the claims. Aspects of the disclosure may consist of any such individual feature or combination of features. In view of the foregoing description it will be evident to one of skill in the art that various modifications may be made within the scope of the disclosure.

It should be understood that the examples provided are merely exemplary of the present disclosure, and that various modifications may be made thereto.

What is claimed is:

1. A method of managing storage of user data of a content recommendation system, the content recommendation system comprising a user learning module for receiving data indicative of user actions, determining one or more learn actions based on the received data and storing the learn actions on a storage resource, the method comprising:
   determining a parameter associated with aging out a learn action stored on a storage resource of a content recommendation system, the learn action determined based on data indicative of a user action, the learn action comprising metadata of content selected by a user, wherein determining the parameter comprises monitoring a frequency of user actions and setting the parameter based on the monitored frequency; and
   aging out the learn action stored on the storage resource based on the parameter, wherein aging out comprises modifying a decay function for assigning weights to a plurality of learn actions stored on the storage resource.

2. The method of claim 1, wherein the learn action comprises an indication that a user has viewed a content item for a specified period of time.

3. The method of claim 1, wherein the parameter is associated with aging out the learn action and additional data.

4. The method of claim 3, wherein the additional data comprises metadata associated with the content item.

5. The method of claim 1, wherein determining the parameter comprises monitoring a remaining storage capacity of the storage resource and setting the parameter based on the remaining storage capacity.

6. The method of claim 1, wherein the parameter comprises a number of learn actions stored on the storage resource.

7. The method of claim 1, wherein aging out comprises aging out the learn action based on the number of actions stored on the storage resource exceeding a threshold.

8. The method of claim 1, wherein aging out comprises deleting the learn action.

9. The method of claim 1, wherein modifying the decay function comprises altering a coefficient of the function associated with the learn action.

10. The method of claim 1, wherein the parameter is content type specific, content source specific, or user type specific.

11. The method of claim 1, wherein the content recommendation system comprises a content recommendation engine for providing a content item recommendations based on an actions of the user and content information concerning content available from one or more content sources.

12. A non-transitory computer-readable medium having computer program code stored thereon, the program code executable by a processor to perform the method of claim 1.

13. The method of claim 1, further comprising modifying the decay function comprises altering a coefficient of the function associated with the learn action to null or zero without deleting the learn action.

14. The method of claim 1, further comprising generating, in real-time upon receiving a content recommendation request from a user, a user profile using the decay function, the user profile for generating a content recommendation.

15. A content recommendation system comprising a user learning module for receiving data indicative of user actions, determining one or more learn actions based on the received data and storing the learn actions on a storage resource, the user learning module for managing storage of user data of the content recommendation system, the learning module configured to:
   determine a parameter associated with aging out a learn action stored on a storage resource of a content recommendation system, the learn action determined based on data indicative of a user action, the learn action comprising metadata of content selected by a user;
   monitor a frequency of user actions and set the parameter based on the monitored frequency; and
   age out the learn action stored on the storage resource based on the parameter, wherein the learning module is further configured to modify a decay function for assigning weights to a plurality of learn actions stored on the storage resource.

16. The content recommendation system of claim 15, wherein the learning module is further configured to:
   monitor a frequency of user actions and set the parameter based on the monitored frequency.

17. The content recommendation system of claim 15, wherein the parameter comprises a content type specific parameter, a content source specific parameter, or a user type specific parameter.

18. The content recommendation system of claim 17, wherein the learning module is further configured to:
   determine the content type parameter associated with aging out a learn action stored on the storage resource, the learn action determined based on data indicative of a user action with content of a specific content type.

19. The content recommendation system of claim 17, wherein the learning module is further configured to:
   determine the content source parameter associated with aging out a learn action stored on the storage resource, the learn action determined based on data indicative of a user action with content from a specific content source.

20. The content recommendation system of claim 17, wherein the learning module is further configured to:
determine the user type parameter associated with aging out a learn action stored on the storage resource, the learn action determined based on data indicative of a user action by a specific user type.

* * * * *